United States Patent
Gunnarsson et al.

(10) Patent No.: US 9,398,477 B2
(45) Date of Patent: Jul. 19, 2016

(54) METHOD AND ARRANGEMENT FOR ASSISTING A NETWORK MANAGEMENT UNIT

(75) Inventors: Fredrik Gunnarsson, Linköping (SE); Mehdi Amirijoo, Linköping (SE); Johan Moe, Mantorp (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 88 days.

(21) Appl. No.: 14/113,349

(22) PCT Filed: Apr. 29, 2011

(86) PCT No.: PCT/SE2011/050542
§ 371 (c)(1),
(2), (4) Date: Oct. 22, 2013

(87) PCT Pub. No.: WO2012/148337
PCT Pub. Date: Nov. 1, 2012

(65) Prior Publication Data
US 2014/0050154 A1 Feb. 20, 2014

(51) Int. Cl.
*H04W 24/08* (2009.01)
*H04L 12/24* (2006.01)
(Continued)

(52) U.S. Cl.
CPC .............. *H04W 24/08* (2013.01); *H04L 41/14* (2013.01); *H04L 43/065* (2013.01); *H04W 24/10* (2013.01)

(58) Field of Classification Search
CPC ............................. H04W 24/07; H04L 5/007
USPC .......... 370/328, 344, 331, 335, 342; 375/130, 375/147
See application file for complete search history.

(56) References Cited

U.S. PATENT DOCUMENTS 6,987,738 B2 * 1/2006 Subramanian et al. ....... 370/252
2003/0087641 A1 * 5/2003 Gustafsson ................... 455/446
(Continued)

FOREIGN PATENT DOCUMENTS

WO 2010051838 A1 5/2010
WO WO2011041754 A1 * 4/2011 ............. H04W 8/20

OTHER PUBLICATIONS

Supplemental European Search Report dated Sep. 30, 2014 for European Regional Stage Application No. 11859695.6-1851, National Stage Entry Date: Jul. 4, 2013 consisting of 6-pages.
(Continued)

*Primary Examiner* — Parth Patel
(74) *Attorney, Agent, or Firm* — Patents on Demand, P.A.; Brian K. Buchheit; Scott M. Garrett

(57) ABSTRACT

A method in a base station for assisting a network management unit in managing a cellular network is provided. The base station determines a status of the cellular network. The status affects a measurement of a quality of a radio channel between the base station and a user equipment comprised in the cellular network. The measurement is to be performed by the user equipment. The base station receives a feedback report from the user equipment comprising the measurement. The base station evaluates a validity of the measurement based on the determined status. The base station sends a report to the network management unit. The report comprises an indication of the measurement and an indication of the validity, thereby assisting the network management unit in managing the cellular network.

12 Claims, 5 Drawing Sheets

(51) Int. Cl.
*H04L 12/26* (2006.01)
*H04W 24/10* (2009.01)

(56) References Cited

U.S. PATENT DOCUMENTS

| | | | |
|---|---|---|---|
| 2003/0137955 A1* | 7/2003 | Kim et al. | 370/332 |
| 2004/0022213 A1* | 2/2004 | Choi et al. | 370/332 |
| 2004/0131026 A1* | 7/2004 | Kim et al. | 370/328 |
| 2005/0041622 A1* | 2/2005 | Dubuc et al. | 370/332 |
| 2005/0047393 A1* | 3/2005 | Liu | 370/352 |
| 2005/0169229 A1* | 8/2005 | Cho et al. | 370/344 |
| 2005/0181811 A1* | 8/2005 | Magnusson et al. | 455/458 |
| 2005/0191965 A1* | 9/2005 | Yu et al. | 455/67.16 |
| 2005/0243762 A1* | 11/2005 | Terry et al. | 370/328 |
| 2006/0045061 A1* | 3/2006 | Duan et al. | 370/342 |
| 2006/0203780 A1* | 9/2006 | Terry | H04L 1/203 370/335 |
| 2007/0149134 A1* | 6/2007 | Sebire et al. | 455/67.11 |
| 2007/0225015 A1* | 9/2007 | Mueckenheim et al. | 455/453 |
| 2007/0293260 A1* | 12/2007 | Xiao et al. | 455/522 |
| 2008/0075119 A1* | 3/2008 | Zhang et al. | 370/503 |
| 2008/0130610 A1* | 6/2008 | Karlsson | 370/342 |
| 2008/0233967 A1* | 9/2008 | Montojo et al. | 455/452.2 |
| 2008/0261530 A1* | 10/2008 | Gerstenberger et al. | 455/63.1 |
| 2009/0010240 A1* | 1/2009 | Papasakellariou et al. | 370/344 |
| 2009/0232070 A1* | 9/2009 | Muharemovic et al. | 370/329 |
| 2009/0247181 A1* | 10/2009 | Palanki et al. | 455/452.2 |
| 2009/0257408 A1* | 10/2009 | Zhang et al. | 370/336 |
| 2009/0258666 A1* | 10/2009 | Pelletier et al. | 455/522 |
| 2009/0274204 A1* | 11/2009 | Chen et al. | 375/228 |
| 2009/0285169 A1* | 11/2009 | Yang et al. | 370/329 |
| 2009/0316842 A1* | 12/2009 | Lu et al. | 375/346 |
| 2010/0056170 A1* | 3/2010 | Lindoff et al. | 455/452.1 |
| 2010/0080176 A1* | 4/2010 | Maas et al. | 370/329 |
| 2010/0098030 A1* | 4/2010 | Wang et al. | 370/335 |
| 2010/0216474 A1* | 8/2010 | Park | H04W 24/10 455/436 |
| 2010/0309797 A1 | 12/2010 | Lindoff et al. | |
| 2011/0081868 A1* | 4/2011 | Kim | H04W 24/10 455/67.11 |
| 2011/0111779 A1* | 5/2011 | Krishnamurthy et al. | 455/501 |
| 2011/0149879 A1* | 6/2011 | Noriega et al. | 370/329 |
| 2011/0159912 A1* | 6/2011 | Zong | 455/522 |
| 2011/0237272 A1* | 9/2011 | Gorokhov et al. | 455/452.1 |
| 2011/0237282 A1* | 9/2011 | Geirhofer et al. | 455/509 |
| 2012/0021753 A1* | 1/2012 | Damnjanovic et al. | 455/450 |
| 2012/0057476 A1* | 3/2012 | Chan et al. | 370/252 |
| 2012/0082038 A1* | 4/2012 | Xu et al. | 370/244 |
| 2012/0094608 A1* | 4/2012 | Shi | H04W 24/10 455/67.11 |
| 2012/0106472 A1* | 5/2012 | Rosa et al. | 370/329 |
| 2012/0176924 A1* | 7/2012 | Wu et al. | 370/252 |
| 2012/0207119 A1* | 8/2012 | Zhang et al. | 370/329 |
| 2012/0307648 A1* | 12/2012 | Okubo et al. | 370/241 |
| 2013/0039398 A1* | 2/2013 | Ko et al. | 375/219 |
| 2013/0083672 A1* | 4/2013 | Johansson et al. | 370/252 |
| 2013/0308589 A1* | 11/2013 | Liu et al. | 370/329 |
| 2014/0016714 A1* | 1/2014 | Chen et al. | 375/260 |
| 2014/0056169 A1* | 2/2014 | Jung | H04W 24/10 370/252 |

OTHER PUBLICATIONS

Awada et al.: "A Game-Theoretic Approach to Load Balancing in Cellular Radio Networks", Personal Indoor and Mobile Radio Communications (PIMRC), 2010 IEEE 21st International Symposium, IEEE, Piscataway, NJ, USA, pp. 1184-1189, XP031838313, ISBN: 978-1-4244-8017-3 Sep. 26, 2010 consisting of 6-pages.

3GPP TS 36.805 V9.0.0 (Dec. 2009), 3rd Generation Partnership Project; Technical Specification Group Radio Access Network; Study of Minimization of Drive-tests in Next Generation Networks; (Release 9) [retrieved on Jan. 20, 2012] Retrieved from the Internet: ,URL: http://www.3gpp.org/ftp/Specs/archive/36_series/36.805/ 36805-900.zip.; abstract; pp. 7-8; 5.1 consisting of 1-page.

Anas et al.—"Performance Analysis of Handover Measurements and Layer 3 Filtering for UTRAN LTE" Personal, Indoor and Mobile Radio Communications, 2007, PIMRC 2007, IEEE 18th International Symposium on Digital Object Identifier: 10.1109/PIMRC. 2007.4394671; Publication Year: 2007; abstract; pp. 1-2; figuer 2 dated Sep. 14, 2011 for European Application No. 11003166.3-1246 consisting of 7-pages.

International Search Report and Written Opinion dated Jan. 30, 2012 for International Application No. PCP/~SE2011/050542, International Filing Date: Apr. 29, 2011 consisting of 10-pages.

Second Written Opinion (Form 408) dated Mar. 14, 2013 for International Application No. PCT/~SE2011/050542, International Filing Date: Apr. 29, 2011 consisting of 10-pages.

International Preliminary Report on Patentability dated May 17, 2013 for International Application No. PCT/~SE2011/050542, International Filing Date: Apr. 29, 2011 consisting of 9-pages.

* cited by examiner

METHOD AND ARRANGEMENT FOR ASSISTING A NETWORK MANAGEMENT UNIT

TECHNICAL FIELD

Embodiments herein relate to a base station and a method in a base station. In particular, embodiments herein relate to assisting a network management unit in managing a cellular network.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also on cell size.

A cell is a geographical area where radio coverage is provided by the base station at a base station site on a specific radio frequency band using a specific radio access technology. One base station, situated on the base station site, may serve one or several cells covering non-overlapping, partly overlapping or completely overlapping geographical areas. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and which is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

Cellular network operators have considerable effort in planning, configuring, optimizing, and maintaining their wireless access networks. These efforts may consume a great part of their Operational Expenditures (OPEX).

One important E-UTRAN requirement from the operators' side is hence a reduction in the cost for deployment, configuration, and optimization phases for the wireless access system. This may involve tasks for operating the cellular network, e.g., planning and verification. Today, operators resort to planning tools to dimension and plan their cellular networks according to a specific business strategy. The approach based on planning tools and prediction is, however, not fully accurate. Reasons for the inaccuracies are imperfections in the used geographic data, simplifications and approximations in the applied propagation models, and changes in the environment, e.g., construction and/or demolition or seasonal effects, i.e. foliage changes. Furthermore, changes in the traffic distribution and user profiles may lead to inaccurate prediction results.

The above mentioned shortcomings force operators to continuously optimize their cellular networks using measurements and statistics, and to perform drive test or walk tests. Drive test and walk tests provide a picture of the end user perception in the field and enables the operator to identify locations causing poor performance and their corresponding cause, e.g. incorrect tilt or handover settings. Drive test and walk tests, however, may only cover a limited part of the cellular network due to access restrictions and the cost and time involved. Further, only a snapshot in time of the conditions in the field is captured.

Hence, for network management purposes, a problem is that only a limited part of the cellular network may be analyzed.

Planning and verification for managing the cellular network may also be based on so called "measurement reports" from user equipments. In such reports the observed service quality may be reported to a network management unit within the cellular network. The triggering of the measurement report may either be periodic, event-triggered or event triggered periodic reporting. Periodic reporting may be initiated when the event occurs. Example of such events may be that an alternative cell is received at higher power levels compared to the serving cell, radio link failure, etc. Optionally, if available, these measurement reports may be tagged with an estimated mobile position. The standardization of such measurement reports is currently being carried out in 3GPP as Minimization of Drive-Tests (MDT).

However, the measurement reports are limited to reporting service quality measurements that are configured via the Radio Resource Control (RRC) measurement control and reporting procedures, such as Reference Symbol Received Power (RSRP) and Reference Symbol Received Quality (RSRQ), which are intended for mobility and other longer time scale radio resource mechanisms.

SUMMARY

In view of the discussion above, it is an object for embodiments herein to provide an improved way of assisting a network management unit in managing a cellular network.

According to a first aspect, the object is achieved by a method in a base station for assisting a network management unit in managing a cellular network. The base station is comprised in the cellular network. The base station determines a status of the cellular network. The status affects a measurement of a quality of a radio channel between the base station and a user equipment comprised in the cellular network. The measurement is to be performed by the user equipment. The base station receives a feedback report from the user equipment, which feedback report comprises the measurement of the quality of the radio channel between the base station and the user equipment. The base station evaluates a validity of the measurement based on the determined status. The base station sends a report to the network management unit. The report comprises an indication of the measurement and an indication of the validity, thereby assisting the network management unit in managing the cellular network.

According to a second aspect, the object is achieved by a base station for assisting a network management unit in managing a cellular network. The base station is comprised in the cellular network. The base station comprises a determination unit, configured to determine a status of the cellular network. The status affects a measurement of a quality of a radio channel between the base station and a user equipment comprised in the cellular network. The measurement is to be performed by the user equipment. The base station further comprises a receiver configured to receive a feedback report from the user equipment. The feedback report comprises the measurement of the quality of the radio channel between the base station and the user equipment. The base station further comprises an evaluation unit configured to evaluate a validity of the measurement based on the determined status. The base station further comprises a sending unit configured to send a report to the network management unit. The report comprises an indication of the measurement and an indication of the validity, thereby assisting the network management unit in managing the cellular network.

Tanks to embodiments herein, wherein the validity of a measurement comprised in a feedback report is evaluated, and by reporting an indication of the measurement and its validity to a network management unit, feedback measurements that are traditionally intended for scheduling and such short term tasks in the base station, may be used by the base station to assist the network management unit in managing the cellular network.

DETAILED DESCRIPTION

Embodiments herein may be exemplified in the following non-limiting description of embodiments.

Figure 1:
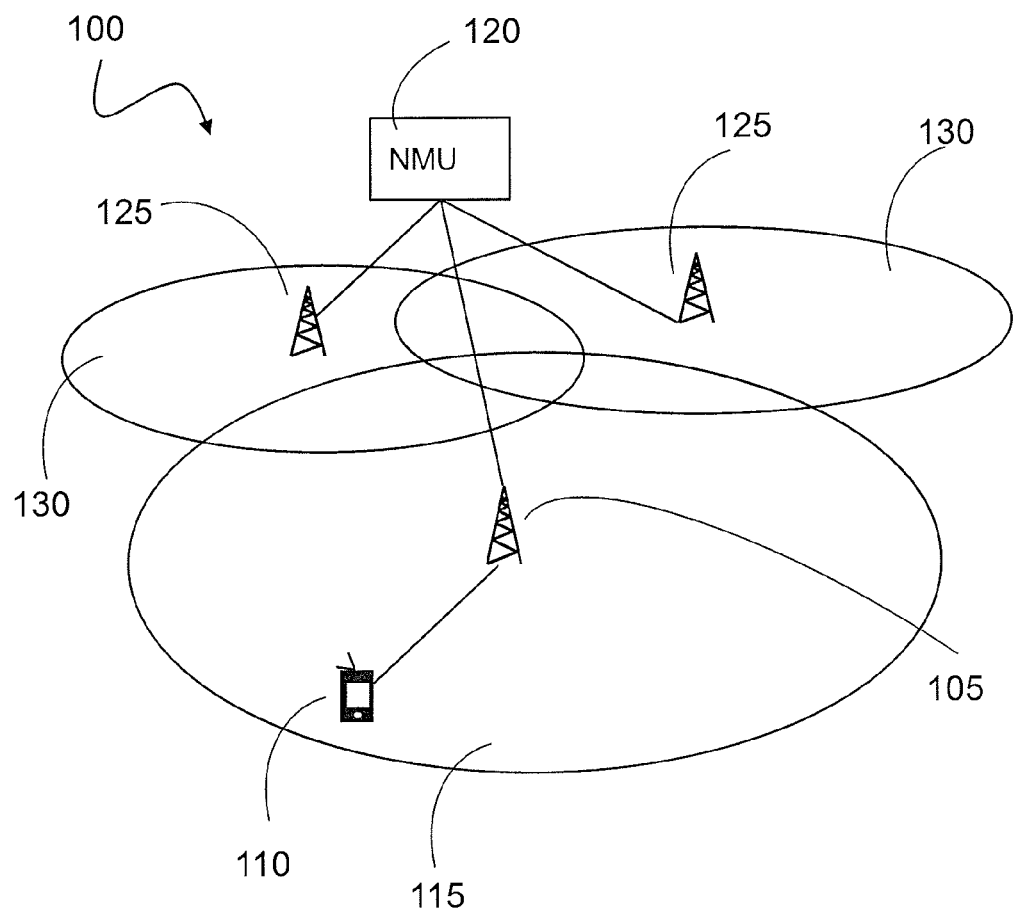
FIG. 1 is a schematic block diagram illustrating an embodiment of a cellular network.

FIG. 1 depicts a cellular network 100. The cellular network 100 may be a LTE cellular network, a WCDMA cellular network, a GSM cellular network, any 3GPP cellular network, or any other cellular network. In this example, the cellular network is of LTE-type.

The cellular network 100 comprises a base station 105. The base station 105 is in this example an eNB, but may in other embodiments be of another type and may in different embodiments be referred to by different names such as for example RBS, eNodeB, NodeB, B node, or BTS, depending on the technology and terminology used. The base station 105 may be of different classes such as e.g. macro eNodeB, home eNodeB or pico base station.

The cellular network 100 further comprises a user equipment 110, which is located in a cell 115 served by the base station 105.

The cellular network 100 further comprises a network management unit 120. The network management unit 120 may be a physical network node or a logical network node. It may form part of the core network or the radio access network of the cellular network 100. The network management unit may form an integrated part of for example the base station 105 or form part of another network node in the cellular network 100, such for example a MME, a RNC, or a dedicated management node such as an Operation Support System, Network Management System or a computer dedicated to processing and analysing measurement data for network management purposes. In this example, the network management unit 120 is an Operation Support System node outside the radio access network and the core network.

The cellular network 100 further comprises two further base stations 125 serving two further cells 130.

For the communication between the base station 105, and the user equipment 110 to function properly, measurements are performed by the user equipment 110 and reported in so called user equipment feedback reports. These measurements are intended for short time scale radio resource mechanisms such as scheduling.

Scheduling may be performed by the base station 105 to allocate transmission resources such as subframes in a time domain, bandwidth in a frequency domain, and transmission layers in a spatial domain. The number of available transmission layers depends on the antenna configuration of the base station 105. In this example, the base station 105 is equipped with four physical antenna ports. The reason for having more than one physical port may be Multiple Input Multiple Output (MIMO) support. The antenna ports may hence be used for transmission on a single antenna port to the user equipment 110, transmission of diversity over several antenna ports to the user equipment 110 and/or spatial multiplexing over several antenna ports to the user equipment 110.

In LTE Release 8 a cell may have 1, 2, or 4 physical antenna ports and different reference signals may be sent out on each of them.

Figure 2:
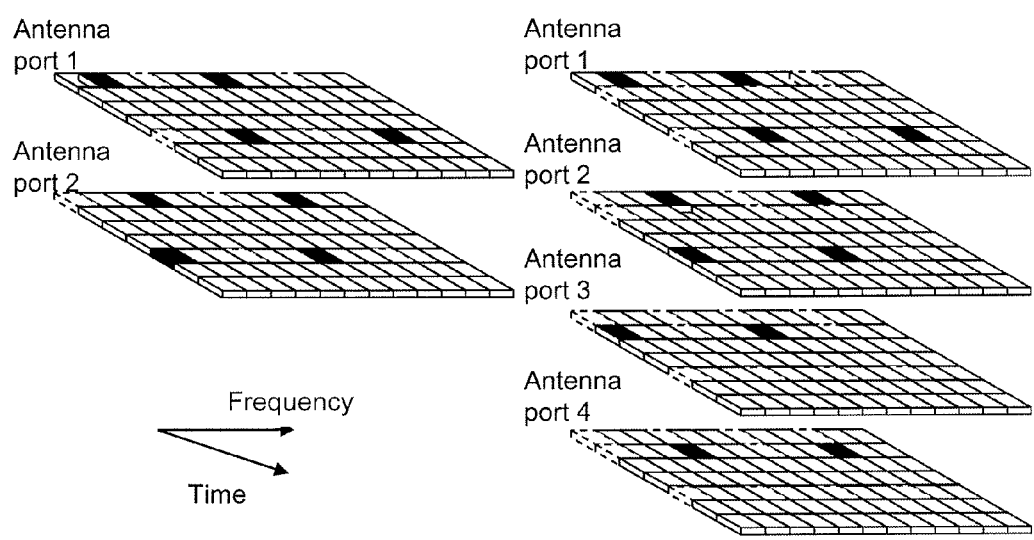
FIG. 2 is a schematic illustration of antenna port configurations in a base station.

FIG. 2 illustrates the reference symbols per antenna port in LTE. In FIG. 2, each coordinate system schematically illustrates an example of a transmission layer, corresponding to an antenna port, and its available transmission resources, divided into so called resource blocks in the time and frequency domain. Each resource block groups several symbols over a time and frequency range, and typically contains one or several reference symbols. In FIG. 2, the reference symbols correspond to the filled squares. Note also that a reference symbol at one transmission layer may correspond to an empty symbol on other transmission layers to avoid interference from other transmission layers. The user equipment 110 may evaluate the received reference symbols and calculate feedback measurements.

The scope of these measurements may depend on a transmission mode of the user equipment 110. In some modes, more feedback may be provided than in others. Hence, the feedback reports may comprise a variety of measurements, since the scheduling of transmissions between the base station 105 and the user equipment 110 may be based on a configurable amount of feedback information from the user equipment 110 and/or the base station 105. In the following some example of feedback report measurements are described.

In the downlink, the user equipment 110 may report a Channel Quality Indicator (CQI), either frequency dependent across a fraction of, or across the entire, bandwidth, or averaged over a fraction or over the entire bandwidth. The user equipment 110 may also report a Rank Indicator (RI), informing about the estimated number of available transmission layers, i.e. antenna ports, and/or a preferred precoding matrix for spatial multiplexing.

In the uplink, the user equipment 110 may be requested to perform channel sounding, which means that it transmits known symbols using a specific power level over a fraction of, or over the entire, bandwidth. The base station 105 may then estimate the uplink path loss. For scheduling purposes, the base station 105 may also estimate the Signal to Interference and Noise Ratio (SINR) and determine a suitable transport format, for example a bit rate and the amount of code protection, for the allocated time-frequency resources. Such measurements in lower layers at the base station may also be considered as feedback reports, not from the UE but rather from the lower layer of the base station.

The feedback report measurements may be reported via Media Access Control (MAC), and are traditionally only intended for scheduling and other shorter time scale radio resource mechanisms in the user equipment and/or base station. Feedback report measurements are hence intended for a completely different use than the measurements comprised in the previously mentioned measurement reports, which are intended for mobility and other longer time scale radio resource mechanisms, and which are handled by the Radio Resource Control (RRC), and not by the MAC.

Embodiments herein are based on the understanding that the feedback report measurements may be rendered useful for a different purpose than scheduling and the like, namely for network management such as spatial performance data aggregation in the network management unit 120. Embodiments herein are also based on the understanding that these feedback measurements, being traditionally intended for other purposes, may critically depend on settings, or statuses, in the cellular network 100 that may make them difficult to interpret, unsuitable, or even misleading, for network management purposes in the network management unit 120.

Thanks to embodiments herein, feedback report measurements, which are typically handled via a Media Access Control (MAC) in the user equipment 110 and/or the base station 105, may hence form the basis for a method in the base station 105 for assisting the network management unit 120 in managing the cellular network 100.

Figure 3:
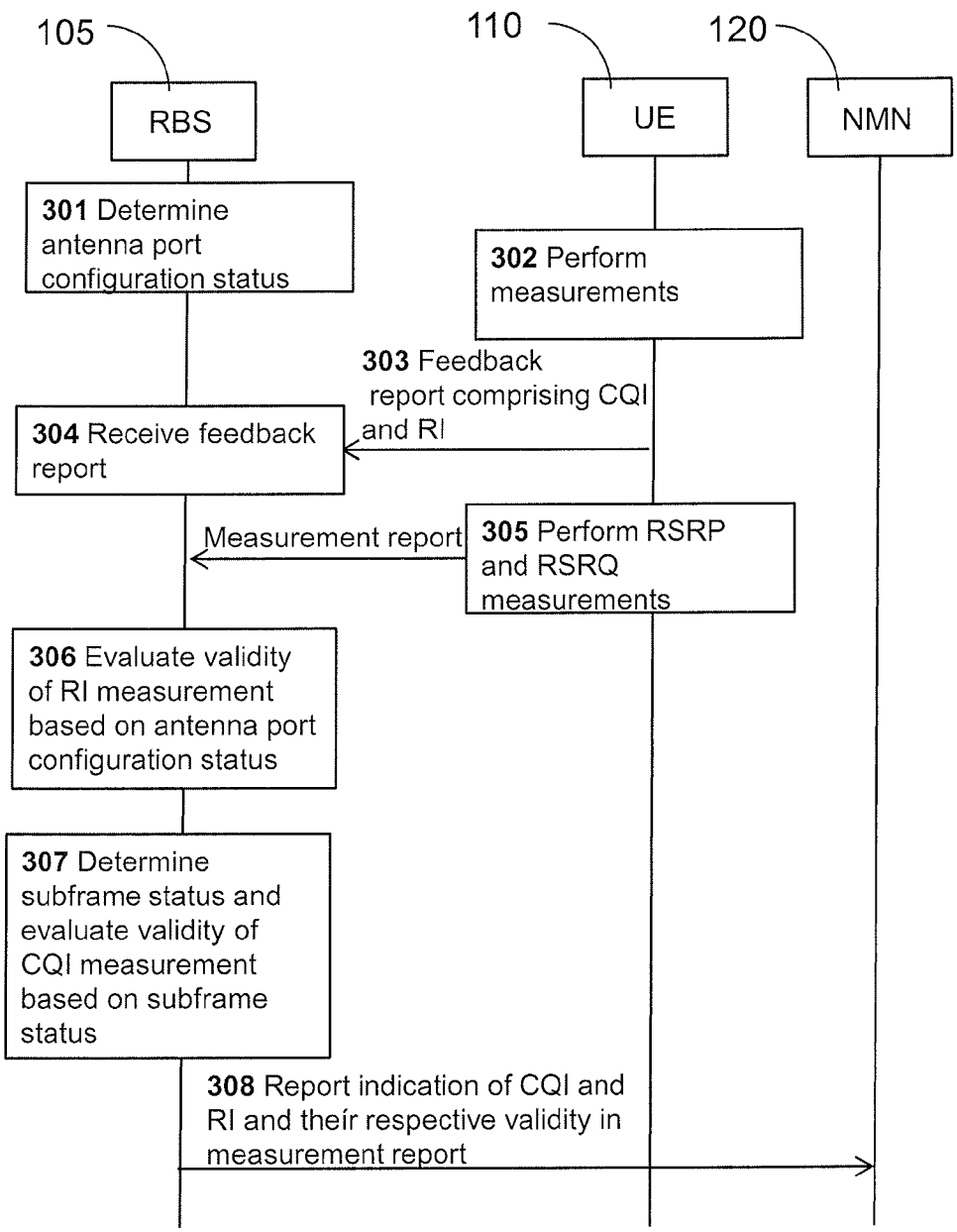
FIG. 3 is a combined signalling scheme and flowchart illustrating embodiments in a cellular network.

FIG. 3 is a combined flowchart and signalling scheme, illustrating how a method in the base station 105 for assisting the network management unit 120 in managing the cellular network 100 according to some embodiments herein may be implemented.

In action 301, the base station 105 determines a status of the cellular network 100. The status is in this example the number of antenna ports that the base station 105 uses. In this example, the base station 105 has disabled three out of four antenna ports for energy saving reasons. This is sometimes referred to as "antenna muting", and is a method to reduce energy consumption in LTE Release 8, for example when the traffic is low in a cell.

In this disclosure, "cellular network status" and "status of the cellular network" may refer to for example one or more of a setting in the base station, such as the above described antenna configuration, but also to a radio situation or performance known to the base station 105, such as an interference level, or a throughput, or a scheduling, etc., as will be described later in this document.

In action 302, the user equipment 110 performs a measurement to estimate the number of antenna ports of the base station 105. In this example, the user equipment 110 correctly estimates the number of antenna ports to one port.

The cellular network 100 being of LTE-type in this example, the user equipment 105 determines the number of antenna ports supported in the cell 115 by decoding the Physical Broadcast CHannel (PBCH). The number of antenna ports is not explicitly signaled on the PBCH and hence, it may not be changed without a complete re-start of the cell. Since the LTE Release 8 standard stipulates that the Physical Downlink Shared CHannel (PDSCH) shall use the same antenna ports as the PBCH, the user equipment 105 may already know the number of antenna ports once it has succeeded in decoding the PBCH properly. The user equipment 110 may then determine the number of antenna ports that the cell 115 supports once, and after that the user equipment 110 may not re-evaluate this decision.

In action 303, the user equipment 110 sends a feedback report comprising the number of transmission layers that it has estimated in the received MIMO channel, i.e. "1" in this example. This feedback measurement is, as previously mentioned, referred to as the rank indicator.

The feedback report also comprises a measurement of the channel quality of the downlink. This feedback measurement is, as also previously described, referred to as the channel quality indicator.

In action 304, the base station 105 receives, e.g. via the MAC, the feedback report with the rank indicator and the channel quality indicator measured by the user equipment 110. The base station 105 may use this information in a traditional way such as in a feedback loop to disclose a suitable transmission format and a suitable number of independent data streams to send over the transmission layers for subsequent transmissions.

In action 305, the user equipment 110 performs traditional performance measurements, such as RSRP and RSRQ, and reports these, via the RRC, in a so called measurement report, as previously described.

In action 306, the base station 105 evaluates a validity of the reported rank indicator measurement by relating it to the antenna configuration status. In this example, it is concluded that the reported rank indicator may be ambiguous, since three antenna ports were disabled when the measurement was performed by the user equipment 110. Hence, the measured rank "1" might be misleading for network management purposes if reported by itself, since it might be interpreted as if three channels out of four experienced severe fading dips, and therefore could not be recognized by the user equipment 110. In a similar example, the four antenna ports are added together and transmitted over one antenna. Hence, the measured rank "1" might be misleading for network management purposes if reported by itself, since it might be interpreted as if the four antenna ports are fully correlated and therefore may not be used for individual streams, and are therefore recognized by the user equipment 110 as a rank 1 channel.

In action 307, the base station 105 further evaluates the channel quality measurement. To do this, the base station 105 determines a further status in the cellular network 100, which in this case is a status of the subframe during which the channel quality was measured by the user equipment 110. If it is determined that the subframe in question was a so called "almost blank subframe" and/or if the subframe was an allocated subframe for the user equipment 110, this status indicates that the measurement has a higher validity than a subframe during which interference is likely to have been more severe. By "almost blank subframe" is understood a subframe during which no other base stations, such as the further base stations 125 in FIG. 1, in the vicinity have scheduled transmissions that may interfere with the transmission in question. In this example, it is concluded that the channel quality measurement has high validity since it was indeed measured during an almost blank subframe.

In action 308, the base station 105 reports the channel quality measurement together with an indication of its high validity to the network management unit 120.

In this action the base station may also report the rank indicator as "full rank", which is an indication both of the rank indicator itself and of its validity.

In another embodiment, the estimated number of antenna ports and the true number of antenna ports may be explicitly reported. In another embodiment, the rank indicator may simply be removed from the report due to the ports being disabled and the validity hence being regarded as too low.

Thanks to the report, the network management unit 120 is assisted in managing the cellular network 100, since it may for example be used to aggregate spatial performance data from the location of the user equipment 110.

In this example, the report is added to the measurement report and is further reported to the network management node. This may be an effective way of performing the reporting, since such measurement reports are intended for mobility and other longer time scale radio resource mechanisms, and may thus be sent to the network management unit 120 anyway. The user equipment measurement reports aim at giving relevant information about the radio network performance, and may also, as previously mentioned, comprise position tagging. By adding the indication of the feedback measurements and their validity to these measurement reports, the network management may be further facilitated. In other embodiments, an indication of the feedback measurement and its validity may be separately reported to the network management unit 120.

Figure 4:
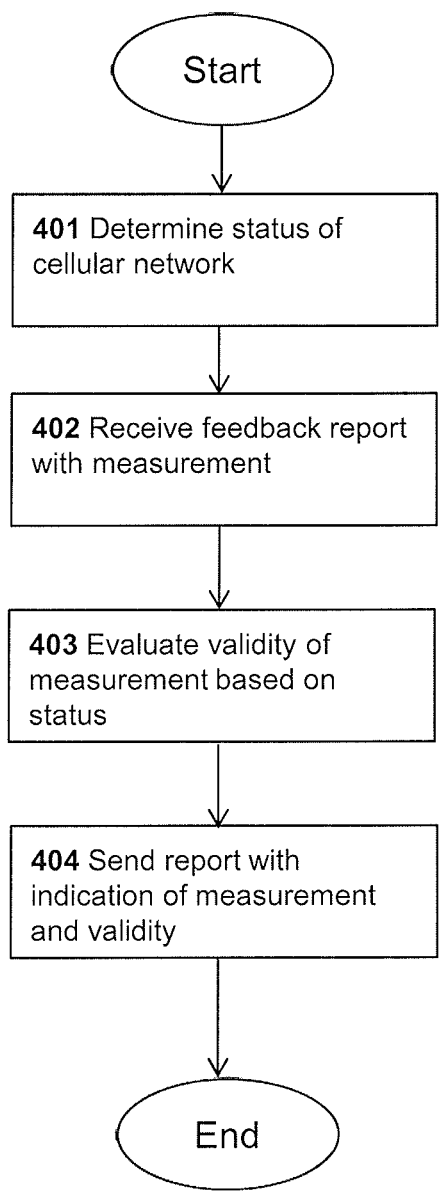
FIG. 4 is a flowchart depicting embodiments of a method in a base station.

In the following, further embodiments herein, relating to a method in the base station 105 for assisting the network management unit 120 in managing the cellular network 100 will be described with reference to the flowchart depicted in FIG. 4. As previously mentioned, the base station is comprised in the cellular network 100, and may be of any of the above, in relation to FIGS. 1-3, described types.

The method comprises the following actions, which actions may be taken in any suitable order:

Action 401

In this action, the base station 105 determines a status of the cellular network 100. The status affects a measurement of a quality of a radio channel between the base station and a user equipment 110 comprised in the cellular network 100. The measurement is to be performed by the user equipment 110.

The measurement may be a rank indicator or a channel quality indicator or a power headroom.

Action 402

In this action, the base station 105 receives a feedback report from the user equipment 110, which feedback report comprises the measurement of the quality of the radio channel between the base station 105 and the user equipment 110.

According to some embodiments, the base station 105 further receives from the user equipment 110 a further measurement of the radio quality.

Action 403

In this action, the base station 105 evaluates a validity of the measurement based on the determined status.

In some embodiments, the evaluating comprises relating the measurement to an antenna port configuration status or an interference status, or a subframe allocation status, or a receiver sensitivity status.

According to some embodiments, the radio channel is a downlink radio channel, the measurement is a rank indicator of the downlink radio channel, and the status is an antenna port configuration of the base station 105. The evaluating may then comprise determining a maximum rank based on the antenna port configuration and relating the rank indicator to the maximum rank.

According to some embodiments, the radio channel is a downlink radio channel, and the measurement is a channel quality indicator measured over a subframe of the downlink radio channel. The evaluating may then comprise relating the channel quality indicator measurement to an interference level of the subframe, and/or to a presence of non-orthogonal downlink signals on the subframe, and/or to if the subframe is an allocated subframe for the user equipment 110, and/or if the subframe is an almost blank subframe.

According to some embodiments, the radio channel is an uplink radio channel, and the measurement is a power headroom. The evaluating may then comprise relating the power headroom measurement to an interference level of the uplink radio channel or to an uplink receiver sensitivity at the base station 105.

Action 404

In this action, the base station 105 sends a report to the network management unit 120. The report comprises an indication of the measurement and an indication of the validity, thereby assisting the network management unit 120 in managing the cellular network 100.

According to some embodiments, the indication of the measurement and/or the indication of the validity is the measurement itself. For example, in some embodiments, only measurements which at the evaluation in action 403 are evaluated to be of at least a certain validity may be reported. According to some embodiments, the report is sent as part of a measurement report.

Due to the relatively short user equipment feedback report time scale, a multitude of user equipment feedback reports together with associated cellular network status may be considered in the evaluation 403 and/or reporting 404.

According to some embodiments, the base station 105 further receives from the user equipment 110 a further measurement of the radio quality, as previously mentioned in relation to action 402. The evaluation may then be further based on the further measurement. It is possible that the user equipment feedback reports are more frequent than the user equipment measurement reports. This means that there might be a multitude of user equipment feedback reports and associated cellular network statuses available since the last user equipment measurement report. In such embodiments, but also in other embodiments where the report is not sent as part of a measurement report, the several feedback measurements may according to different embodiments herein be handled and combined in a number of different ways in the evaluation in action 403, and in the reporting in action 404, examples of which ways are listed below:

- Only the most recent user equipment feedback report and associated cellular network status may be considered.
- The user equipment feedback reports and associated cellular network status since the previous report may be averaged.
- Only the worst case user equipment feedback report and associated cellular network status may be considered.
- Only the median user equipment feedback report and associated cellular network status may be considered.
- Only a percentile of user equipment feedback reports and associated cellular network status may be considered.
- Only the majority vote of the user equipment feedback reports and associated cellular network statuses may be considered. For example, if the rank indicators 2,2,2,2, 2,3,3,2,2 are stored since the last report, and the base station 105 has had 4 antenna ports transmitted during this period of time, the rank indicator 2 out of 4 may be reported.

The management system in LTE comprises Node Elements (NE) in the form of eNodeB. These are managed by a Domain Manager (DM), also referred to as the Operation and Support System (OSS). A DM may further be managed by a Network Manager (NM). Two NEs may inter-connect using the X2 interface, or via the MME using S1 interfaces, whereas the interface between two DMs is referred to as Itf-P2P. Functions that automatically optimize NE parameters may execute in the NE, DM, or the NMS. Hence, the network management unit 120 may be a physical or logical node which may form part of one or more of the entities comprised in the management system. The term "cellular network" should hence not be taken as limiting in the sense that the network management unit 120 may form part of a core network in some embodiments, and the reports may be sent from the base station over land line or over radio link.

In the following, feedback report measurements which may be relevant for various embodiments herein are described in more detail, along with descriptions of possible statuses of the cellular network 100 that may affect one or more of the measurements. The following measurements and statuses may hence be taken into consideration in action 401 when the status is determined, and/or in action 403 when the validity of the measurement is evaluated.

Rank Indicator

The rank indication measurement from the user equipment 110 provides information about the channel rank, that is the number of layers or streams that may be be used for DL transmission. Hence, the rank indicator feedback from the user equipment 110 informs the base station 105 about the estimated number of available transmission layers for spatial multiplexing. A low rank may indicate that the dispersiveness of the radio channel is low, and that the MIMO potential is limited. However, a low rank may also be due to the fact that the base station 105 has muted one of several antenna ports, as previously described. There are also several possible antenna configuration statuses that may be relevant for evaluating the validity of a rank indication measurement. For example, one or more physical antenna ports may be muted, and one or more virtual antenna ports may be added, and/or one or more sum signals from several antenna ports may be transmitted. In some embodiments, different virtual antenna ports may be added with various possibly pseudo random combination weights. The validity of a rank indication may therefore be evaluated in comparison to the maximum rank, which depends on the number of transmitted antenna ports. If the rank is equal to the number of antenna ports, then the channel may be referred to as being of "full rank".

Precoding Matrix Indication

This measurement from the user equipment 110 informs the base station 105 about which precoding matrix that may be the most suitable for downlink communication, or an indicator of a suitable precoding matrix that may maximize the number of available transmission layers, or antenna ports. For this purpose, the user equipment 110 may essentially evaluate a list of possible precoding matrices, and select the most favorable one. The validity may depend on the number of available antenna ports. If some of them are muted or combined, then the interpretation of the precoding matrix indication should be done with consideration of the antenna port configuration.

Power Headroom

Power headroom measurements address the uplink power situation relative the maximum transmitter power level. Insufficient power headroom may indicate that the uplink coverage is insufficient. However, it may also depend on the interference contribution at the uplink receiver. Therefore, the power headroom may be adjusted to correspond to a nominal interference level, instead of the actual interference level. It may also depend on the required signal to interference and noise ratio for the assigned transport format. Therefore, the power headroom may be adjusted to correspond to a nominal signal to interference and noise ratio level.

Insufficient power headroom may also trigger initiation of uplink channel sounding to enable the base station 105, to report uplink path gain estimates.

Uplink Channel Quality Indicators

Channel-quality indication measurements represent the recommended modulation scheme and coding rate that should be used for DL transmissions. The user equipment 110 may report CQI for either a fraction of, or for the entire, frequency band, either with frequency resolution or aggregated over a fraction or the entire frequency band.

The validity, or relevance, of the CQI may depend on whether the user equipment 110 is (re-)assigned resources depending on reported channel quality, and if the user equipment 110 is only reporting channel quality for assigned resources and/or on whether the base station 105 is aware of significant downlink interference contributions. For example, the base station 105 may be aware of non-orthogonal downlink signals that results in downlink interference. CQIs considered to be irrelevant at evaluation may be omitted from the reports.

According to some embodiments herein, the base station 105 may consider user equipment feedback report measurements and cellular network cellular network statuses such as for example the following:

- Feedback measurement in the form of a rank indicator, and the cellular network status in the form of a number of transmitted antenna ports.
- Feedback measurement in the form of a precoding matrix indicator, and the cellular network status in the form of associated user equipment scheduling.

Feedback measurement in the form of an uplink power information and the cellular network status in the form uplink receiver sensitivity information. The uplink sensitivity information may be uplink interference and/or information about whether the uplink receiver combines a multitude of uplink transmissions before decoding.

Feedback measurement in the form of a channel quality indicator and the cellular network status in the form of base station power information.

Feedback measurement in the form of a channel quality indicator and the cellular network status in the form of base station scheduling information.

The user equipment measurement reports give relevant information about the radio network performance. Together with position tagging, this may be used to aggregate spatial performance information. However, the user equipment measurement report scope is limited. According to some embodiments herein, the measurement reports are enriched by the base station combining user equipment feedback report measurements with relevant cellular network status.

Hence, according to various embodiments herein, the base station 105 assists the network management unit 120 in managing the cellular network 100, by providing accurate rank information considering eNB antenna power muting accurate uplink power headroom information considering uplink receiver sensitivity accurate channel quality information considering base station power information and/or scheduling information.

Figure 5:
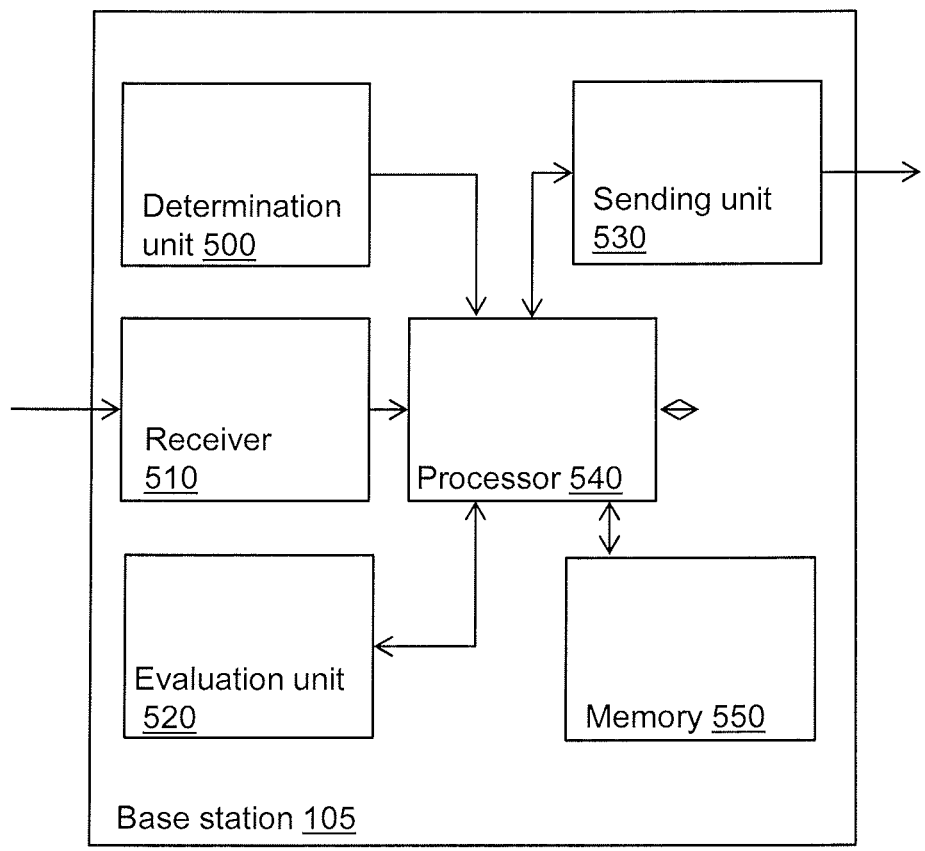
FIG. 5 is a schematic block diagram illustrating embodiments of a base station.

To perform the actions above for assisting the network management unit 120 in managing the cellular network 100, the base station 105 comprises an arrangement schematically depicted in FIG. 5.

The term "configured to" used herein may also be referred to as "arranged to".

As previously mentioned, the base station 105 is comprised in the cellular network 100.

The base station 105 comprises a determination unit 500. The determination unit 500 is configured to determine a status of the cellular network 100. The status affects a measurement of a quality of a radio channel between the base station and the user equipment 110 comprised in the cellular network 100. The measurement is to be performed by the user equipment 110.

The measurement may be a rank indicator or a channel quality indicator or a power headroom.

The base station 105 further comprises a receiver 510. The receiver 510 is configured to receive a feedback report from the user equipment 110. The feedback report comprises the measurement of the quality of the radio channel between the base station 105 and the user equipment 110.

The base station 105 further comprises an evaluation unit 520. The evaluation unit 520 is configured to evaluate a validity of the measurement based on the determined status.

According to some embodiments, the evaluation unit 520 is configured to relate the measurement to an antenna port configuration status or an interference status, or a subframe allocation status, or a receiver sensitivity status.

According to some embodiments, the radio channel is a downlink radio channel, the measurement is a rank indicator of the downlink radio channel, and the status is an antenna port configuration of the base station 105. The evaluation unit 520 may then further be configured to determine a maximum rank based on the antenna port configuration and relating the rank indicator to the maximum rank.

According to some embodiments, the radio channel is a downlink radio channel and the measurement is a channel quality indicator measured over a subframe of the downlink radio channel. The evaluation unit 520 may then further be configured to relate the channel quality indicator measurement to an interference level of the subframe, and/or to a presence of non-orthogonal downlink signals on the subframe, and/or to if the subframe is an allocated subframe for the user equipment 110, and/or if the subframe is an almost blank subframe.

According to some embodiments, the radio channel is an uplink radio channel and the measurement is a power headroom. The evaluation unit 520 may then further be configured to relate the power headroom measurement to an interference level of the uplink radio channel or to an uplink receiver sensitivity at the base station 105.

The base station 105 further comprises a sending unit 530. The sending unit 530 is configured to send a report to the network management unit 120. The report comprises an indication of the measurement and an indication of the validity, thereby assisting the network management unit 120 in managing the cellular network 100.

The sending unit 530 may further be configured to send the report as part of a measurement report.

The embodiments of the base station 105 for assisting the network management unit 120 in managing the cellular network 100 may be implemented through one or more processors, such as a processor 540 in the base station 105 depicted in FIG. 5, together with computer program code for performing the actions of embodiments herein.

The program code mentioned above may also be provided as a computer program product, for instance in the form of a data carrier carrying computer program code for performing the embodiments herein when being loaded into the base station 105.

One such carrier may be in the form of a CD ROM disc. It is however feasible with other data carriers such as a memory stick. The computer program code may furthermore be provided as pure program code on a server and downloaded to the base station 105 e.g. remotely.

The base station 105 may further comprise a memory 550 comprising one or more memory units. The memory 550 may be arranged to be used to store data such as for example status information, one or more feedback reports and/or measurements. It may further be arranged to store applications to perform the actions of the embodiments herein when being executed in the base station 105.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a base station for assisting a network management unit in managing a cellular network comprising the base station, the method comprising:

determining a networking status of the cellular network based on at least one setting of the base station, wherein the networking status affects a measurement of a quality of a radio channel between the base station and a user equipment comprised in the cellular network, wherein the measurement is to be performed by the user equipment, wherein the quality of the radio channel indicates a measurable factor defining an ability of at least one of the user equipment and the base station to interact using the radio channel;

receiving a feedback report from the user equipment, the feedback report comprises the measurement of the quality of the radio channel between the base station and the user equipment;

evaluating a validity of the measurement based on the determined networking status for verifying a correctness of the measurement to be used by the network management unit in the management of the cellular network; and sending a network performance report to the network management unit, the network performance report comprises an indication of the measurement and an indication of the validity, thereby assisting the network management unit in managing the cellular network, wherein the radio channel is a downlink radio channel, wherein the measurement is a rank indicator of the downlink radio channel, wherein the networking status is an antenna port configuration of the base station, and wherein the evaluating comprises determining a maximum rank based on the antenna port configuration and relating the rank indicator to the maximum rank.

2. The method according to claim 1, wherein the evaluating comprises relating the measurement to one of an antenna port configuration status, an interference status, a subframe allocation status, and a receiver sensitivity status.

3. The method according to claim 1, wherein the radio channel is a downlink radio channel, wherein the measurement is a channel quality indicator measured over a subframe of the downlink radio channel, and wherein the evaluating comprises relating the channel quality indicator measurement to at least one of:

an interference level of the subframe;
a presence of non-orthogonal downlink signals on the subframe;
whether the subframe is an allocated subframe for the user equipment; and
whether the subframe is an almost blank subframe.

4. The method according to claim 1, wherein the radio channel is an uplink radio channel, wherein the measurement is comprises a power headroom and the rank indicator, and wherein the evaluating comprises relating the power headroom measurement to one of an interference level of the uplink radio channel and an uplink receiver sensitivity at the base station.

5. The method according to claim 1, wherein the network performance report that is sent to the network management unit is sent as part of a measurement report.

6. The method according to claim 1, wherein the receiving comprises receiving a further measurement of a radio quality from the user equipment, and wherein the evaluation is further based on the further measurement.

7. A base station for assisting a network management unit in managing a cellular network comprising the base station, the base station comprising:

a determination unit configured to determine a networking status of the cellular network based on at least one setting of the base station, wherein the networking status affects a measurement of a quality of a radio channel between the base station and a user equipment in the cellular network, wherein the measurement is to be performed by the user equipment, wherein the quality of the radio channel indicates a measurable factor defining an ability of at least one of the user equipment and the base station to interact using the radio channel;

a receiver configured to receive a feedback report from the user equipment, wherein the feedback report comprises the measurement of the quality of the radio channel between the base station and the user equipment;

an evaluation unit configured to evaluate a validity of the measurement based on the determined networking status for verifying a correctness of the measurement to be used by the network management unit in the management of the cellular network; and a sending unit configured to send a network performance report to the network management unit, the network performance report comprising an indication of the measurement and an indication of the validity, thereby assisting the network management unit in managing the cellular network, wherein the radio channel is a downlink radio channel, wherein the measurement is a rank indicator of the downlink radio channel, wherein the networking status is an antenna port configuration of the base station, and wherein the evaluation unit is configured to determine a maximum rank based on the antenna port configuration and relating the rank indicator to the maximum rank.

8. The base station according to claim 7, wherein the evaluation unit is further arranged to relate the measurement to one of an antenna port configuration status, an interference status, a subframe allocation status and a receiver sensitivity status.

9. The base station according to claim 7, wherein the radio channel is a downlink radio channel, wherein the measurement is a channel quality indicator measured over a subframe of the downlink radio channel, and wherein the evaluation unit is further configured to relate the channel quality indicator measurement to at least one of:

an interference level of the subframe;
a presence of non-orthogonal downlink signals on the subframe;
whether the subframe is an allocated subframe for the user equipment; and
whether the subframe is an almost blank subframe.

10. The base station according to claim 7, wherein the radio channel is an uplink radio channel, wherein the measurement comprises a power headroom and the rank indicator, and wherein the evaluation unit is further configured to relate the power headroom measurement to one of an interference level of the uplink radio channel and an uplink receiver sensitivity at the base station.

11. The base station according to claim 7, wherein the network performance report that is sent to the network management unit by the sending unit is sent as part of a measurement report.

12. The base station according to claim 7, wherein the receiver is further configured to receive from the user equipment a further measurement of a radio quality, and wherein the evaluation unit is further configured to base the evaluation on the further measurement.

\* \* \* \* \*